United States Patent [19]

Neeloff

[11] 3,927,389

[45] Dec. 16, 1975

[54] DEVICE FOR DETERMINING, DURING OPERATION, THE CATEGORY OF A VEHICLE ACCORDING TO A PRE-ESTABLISHED GROUP OF CATEGORIES

[75] Inventor: Victor Neeloff, Paris, France

[73] Assignee: Compagnie Generale d'Automatisme, Paris, France

[22] Filed: Dec. 6, 1974

[21] Appl. No.: 530,097

[30] Foreign Application Priority Data
Dec. 7, 1973 France .............................. 73.43750

[52] U.S. Cl. ...... 340/38 R; 235/92 TC; 235/150.24
[51] Int. Cl.² ......................................... G08G 1/015
[58] Field of Search ........ 340/22, 31 R, 31 A, 38 R; 235/92 R, 92 TC, 92 PK, 99 A, 150.24

[56] References Cited

UNITED STATES PATENTS

| 3,710,081 | 1/1973 | Apitz .............................. 235/150.24 |
| 3,748,443 | 7/1973 | Kroll et al. ..................... 340/38 R X |

*Primary Examiner*—Alvin H. Waring
*Attorney, Agent, or Firm*—Sughrue, Rothwell, Mion, Zinn & Macpeak

[57] ABSTRACT

A vehicle category indicator or registering device is disclosed which is characterized in that it comprises a certain number of sensors arranged on the roadway, a vehicle separator device, all these being related to memories through an electronic circuit such that the memories are automatically reset to zero after the passing of the vehicle and that it is impossible for a preceding vehicle to disturb the measurements made on the following vehicle.

6 Claims, 3 Drawing Figures

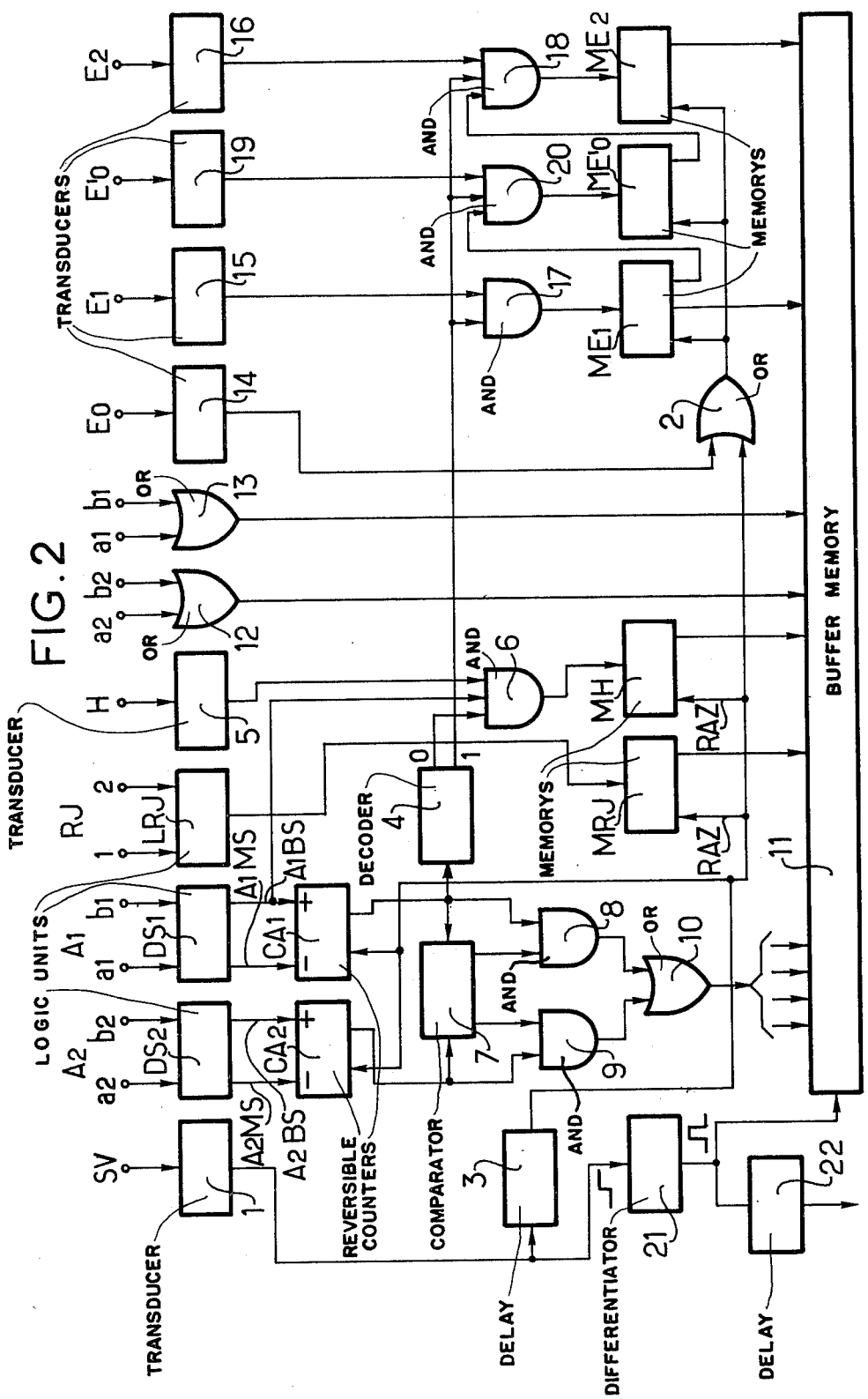

DEVICE FOR DETERMINING, DURING OPERATION, THE CATEGORY OF A VEHICLE ACCORDING TO A PRE-ESTABLISHED GROUP OF CATEGORIES

BACKGROUND OF THE INVENTION

1. Field of the Invention

The present invention concerns an automatic device for determining the category to which a vehicle belongs.

2. Description of the Prior Art

It is known that the tariff applied on toll roads is not the same for all types of vehicles; a classification of vehicles according to their wheel base has indeed been established.

The invention relates to a device which may be arranged at the entrance to a motor-way and making it possible to provide, by the simple passing of the vehicle, a signal which is a function of the category of the vehicle.

In his French Pat. No. 2,093,237, the applicant has described a device comprising a set of sensors for sensing the passing of axles, related to axle counting and reverse counting means.

Such a device has a disadvantage due to the fact that if an error occurs in one of the counters, during the passing of a vehicle, it is maintained permanently and distorts the determining of the category of the vehicles which pass subsequently.

SUMMARY OF THE INVENTION

One aim of the present invention is to produce a device which does not have the aforesaid disadvantage.

The invention has for its object a device for determining the category of a moving vehicle according to a pre-established group of categories. This is accomplished by providing at least one detector detecting the passing or presence of axles, called the counting detector A1 arranged transversally to the roadway and related, through a logic device DS1 for determining the direction of movement. The logic device controls a reversible counter CA1 for counting the number of axles crossing the said detector. A vehicle separating device SV placed a short distance away, in the direction of movement of the vehicles and related to a transducer element 1 provides an electric signal when no vehicle is placed in front of the separator device SV. There is also provided detector for detecting the passing or presence of axles called the detector for resetting to zero Eo arranged transversally on the roadway and situated at a distance from said counting detector which is less than the minimum wheel base which is required to be determined and related with a mechanical-electrical transducer element 14 providing an electric signal when the sensor is actuated, the said transducing element being connected to one of the two inputs of a logic OR element 2 whose other input is connected through a delay circuit 3 to the said transducer 1 related to the vehicle separating device SV. At least one detector for detecting the passing or presence of axles, called the wheel base detector E1 is placed transversally on the roadway and downstream from the detector for resetting to zero in relation to the direction of movement of the vehicles, related to a mechanical-electrical transducer element 15 whose output is connected to one of the two inputs of a logic AND gate 17 whose other input is connected to the output 1 corresponding to the passing of a single axle of a vehicle on the counting detector A1, of a decoder 4 related to the reversible counter CA1 which comprises, moreover, an input for resetting to zero connected, through the said delay circuit 3 to the said transducer 1 related to the vehicle separating device SV. The output of the said logic AND element 17 is connected to the input of a wheel base memory ME1 which comprises, moreover an input for resetting to zero connected to the output of the said logic OR element 2.

BRIEF DESCRIPTION OF THE DRAWINGS

With reference to the accompanying figures, an example of the implementing of the invention having no limiting character will be described.

FIG. 2 is a diagram of the electronic device related to the detectors.

DESCRIPTION OF THE PREFERRED EMBODIMENT

Figure 1:
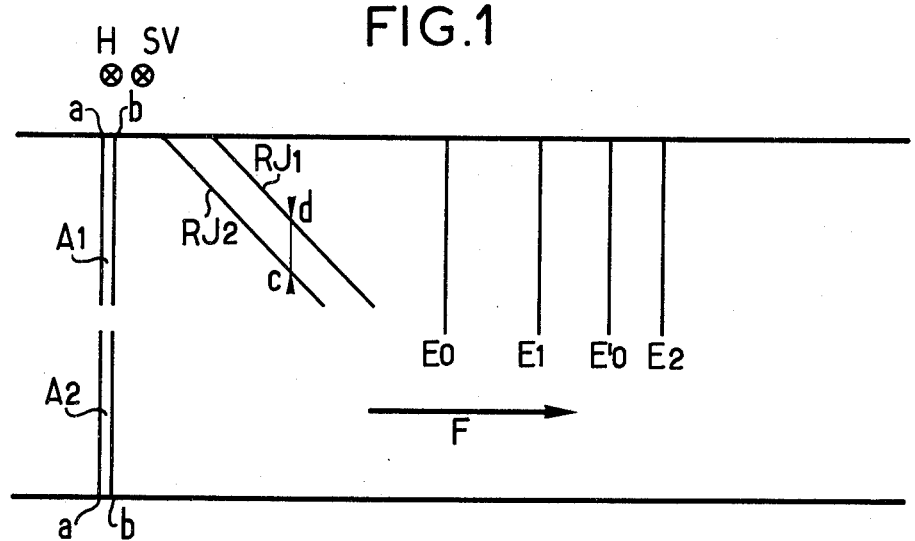
FIG. 1 is an access highway with the various detectors making it possible to distinguish three categories of wheel base.

On referring to FIG. 1, which is an access highway for vehicles, various detectors may be seen:

A double detector A1 ($a, b$) on the left half of the roadway with reference to the arrow F, constituted by two linear pressure sensors $a, b$; these are axle passing or presence detectors called counting detectors;

A double detector A2 ($a, b$) on the right half of the roadway, constituted also by two linear pressure sensors $a, b$;

These detectors A1 and A2 have the function of counting the number of axles; the separation thereof into two distinct detectors A1 and A2 makes it possible to distinguish motor cycles from automobiles and lorries and the doubling thereof: $a, b$, makes it possible to discriminate the direction of movement of the vehicles;

Two detectors for detecting twin or wide wheels: RJ1 and RJ2 inclined at 45° which are also linear pressure detectors: if the half perimeter of the projection of the carrying area is equal to or greater than the distance $cd$, the two detectors RJ1 and RJ2 are actuated at the same time;

Another detector Eo for detecting the passing or presence of axles, for example, a linear pressure detector called a detector for resetting to zero.

The distance A1 Eo is less than the smallest existing wheel base. The function of that sensor will be explained subsequently when FIG. 2 is described;

Detectors E1 and E2 which are also linear pressure detectors make it possible to determine the wheel bases; these detectors detect the passing of the axles and are called wheel base detectors. Three categories of wheel base may be distinguished; the first comprised between A1Eo and A1E1, the second between A1E1 and A1E2 and the third greater than A1E2, An auxiliary detector E'o whose function will also be explained further on;

A height detector H situated on level with the detectors A1 and A2 and at a height of about 1.20m, classifying the vehicles according to their height at the level of the front wheel;

A vehicle separating detector SV, constituted by a set of optical sensors situated on a same vertical line or by a continuous vertical optical barrier, or a magnetic loop; that detector is placed near the counting detector A1.

FIG. 2 is a block diagram of the electronic assembly related to the detectors.

A first transducer 1 transforms the signal given by the vehicle separator SV into an electric signal. When no vehicle is present, supposing that the vehicle separator is an optical barrier, then its beam is established and the transducer 1 sends out a signal which, through a logic OR element 2 and through a delay circuit 3, maintains memories ME1, ME'O, ME2, MRJ, MH and reversible counters CA1 and CA2 in the "zero" state.

When a vehicle arrives, it blacks out the beam from the vehicle separator SV; the signal sent out by the transducer 1 disappears, this releasing all the memories and the reversible counters CA1 and CA2. The left wheel of the first axle actuates the detector A1; a direction discriminator logic unit DS1 for determining the direction related to that detector provides a pulse A1BS if the vehicle moves in the right direction, that is, in the direction of the arrow F in FIG. 1 and a pulse A1MS in the contrary case. The pulse A1MS is sent to the "minus" input of the reversible counter CA1; this is therefore a reverse count. The pulse A1BS, caused by the passing of a wheel in the direction of the arrow F on the detector A1, is sent to the "plus" input of the reversible counter CA1; this is a counting pulse; the output of the reversible counter CA1 is connected to the input of a decoder 4 having multiple outputs only two of which, the output 0 and the output 1, are used. If the contents of the reversible counter CA1 is equal to "zero," there is a signal on the output of the decoder 4; if the contents of the reversible counter CA1 is equal to "one, " there is a signal on the output 1 of the decoder 4; if the contents of the reversible counter CA1 is greater than "one," there is no signal on the output 0 or on the output 1 of the decoder 4, but there is one on other outputs which are not dealt with here.

During the presence of that pulse A1BS, that is, when the left wheel of the first axle is on the detector A1, the height test is effected by means of the detector H; if the beam is blacked out, a transducer 5 provides a signal sent to a first input of an AND gate 6. The AND gate 6 has a second input connected to the output 0 of a decoder 4 and a third input connected to the output A1BS of the logic unit DS1 for determining the direction.

Before the arrival of the vehicle, the reverse counting counter CA1 is at 0 and the decoder 4 provides a signal on its output 0; the counter CA1 changes over to 1 only when the pulse A1BS has disappeared, that is, when the left wheel has crossed the detector A1; at that instant, the decoder 4 provides a signal at its output 1. Thus, when the left front wheel of a vehicle is on the detector A1 (pulse A1BS, decoder 4 in the state 0), and at the same instant the beam of the detector H is blacked out, all the conditions are fulfilled for the AND gate 6 to open, allowing a signal to enter the memory MH. The memory MH therefore registers a data item if the height of the vehicle at the level of the first axle is greater than or equal to the height of the sensor H.

On the disappearance of the signal A1BS, when the left front wheel has crossed the detector A1, the counter CA1 changes over to 1 and the counter CA2 is also shifted by the passing of the right front wheel on the detector A2 related to the direction discriminator logic unit DS2. The output of the reversible counter CA1 is connected on the one hand to the input of the decoder 4, and, on the other hand, to a first input of a comparator 7 and to a first input of a logic AND element 8. Likewise, the output of the reversible counter CA2 is connected to a second input of the comparator 7 and to a first input of a logic AND element 9. The comparator 7 has two outputs one of which is connected to a second input of the logic AND element 8 and the other of which is connected to a second input of the logid AND element 9. If the number of pulses of the counter CA1 is greater than the number of pulses of the counter CA2, the first output of comparator 7 — that connected to the logic AND element 8 — sends out a signal; in the contrary case, the other output — that connected to the logic AND element 9 — sends out a signal. The outputs of the elements 8 and 9 are connected to the inputs of a logic OR element 10. The output of the logic OR gate 10 is connected to a buffer memory 11. Thus, one of the axle sensors A1 or A2 may have a breakdown, but this is of no importance, since only the highest value is retained. The sensors A1 and A2 are also connected respectively to logic OR elements 12 and 13 whose outputs are connected to the buffer memory 11; thus, vehicles having two wheels abreast are distinguished from vehicles having a single wheel abreast (motor cycles).

The left front wheel then passes on the detectors RJ1 and RJ2; in the case of twin wheels or wheels on which the half perimeter of the carrying area is equal to or greater than the distance cd (FIG. 1), the two detectors RJ1 and RJ2 are actuated simultaneously and a logic unit LRJ for twin wheels sends out a signal memorized in a memory MRJ for twin wheels whose output is connected to the buffer memory 11.

The wheel then passes on the detector EO related to a transducer 14 sending out a signal which, through the logic OR element 2, confirms or sets to the state 0 the wheel base memories ME1 and ME2. That detector is necessary when the vehicles follow very close one behind another; this is the case when the categories are determined before the vehicle passes before the cash desk to pay the sum due, but that detector is not necessary in a post-determination configuration, that is, when the determining device is situated after the cash desk and when it is used only for checking. Indeed, in this latter case, the interval separating two successive vehicles is generally sufficient and makes it possible to consider these vehicles as isolated vehicles. In that case, a resetting to zero of the memories ME1 and ME2 by the re-establishing of the beam of the vehicle separator SV is sufficient.

Transducers 15 and 16 are related to the memories ME1 and ME2 through logic AND gates 17 and 18. Likewise, a transducer 19 is related to the memory ME'O through a logic AND gate 20. For the gate 17 to open and a signal to be stored in the memory ME1, the front wheels of the vehicle must be on the detector E1 and the decoder 4 must emit a signal on the 1 output, that is, the second axle of the vehicle must not yet have crossed the detector A1.

If, during the run of the front axle between E1 and E2, the second axle crosses the detector A1, the decoder 4 will send out a signal on its output 2, this blocking the logic gates 18 and 20; on the other hand, if the front axle crosses the detector E2 before the second axle crosses the detector A1, then the transducer 16 sends out a signal to the memory ME2. The memories ME1 and ME2 have their output connected to the buffer memory 11.

Thus, in the example described, three categories of wheel base are distinguished: the first, corresponding to a wheel base less than the distance A1E1; in that case, neither of the memories ME1 and ME2 registers a signal; the second, corresponding to a wheel base between the distance A1E1 and the distance A1E2; the memory ME1 then registers a signal; and the third corresponding to a wheel base greater than the distance A1E2; the memories ME1 and ME2 then both register a signal.

Figure 3:
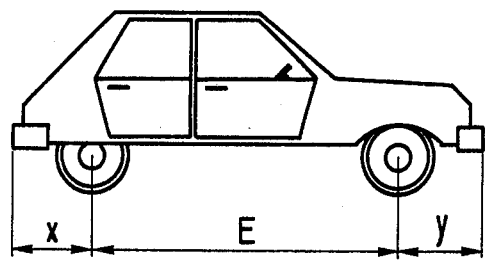
FIG. 3 is a drawing of an automobile with various parameters which are to be taken into account in the spacing out of the various detectors.

In order to better understand another feature of the invention, reference is made to FIG. 3 wherein E is the vehicle wheel base to be measured. The distance $x$ is the rear overhang of the vehicle, i.e., the distance from the rear axle to the end of the vehicle. On the other hand, the distance $y$ is the front overhang of the vehicle, i.e., the distance from the front axle to the front of the vehicle. The function of the sensor E'o connected to the transducer 19, which is itself connected to the memory ME'o is as follows: taking an automobile whose rear axle has not yet crossed the sensor E2 whereas the front axle of the following automobile has already crossed the sensor E1 without the rear axle of that second automobile having yet crossed the sensor A1, this means that the decoder 4 is in the state 1 and that in the absence of the elements E'o, transducer 19, memory ME'o, the output of ME1 would be connected to an input of the logic AND element 18 and as the front axle of the second vehicle has crossed the sensor E1, it would then be sufficient for the rear axle of the first vehicle to cross the sensor E2 for the gate 18 to open; therefore, to avoid that, it is necessary, either for the distance separating the sensors E1 and E2 to be less than $x + y$ (FIG. 3) or, if that distance E1, E2 is imposed for the categories of wheel base, to insert a sensor E'o between the sensors E1 and E2 in order that the gate 18 be able to open only if the memory ME'o has been actuated. This second solution has been chosen in the case of FIG. 2.

Of course, the sensor E'o must be placed at a distance from the sensor E2 less than the distance $x + y$; thus, it will not be possible for the axle of the second vehicle to cross E'o before the last axle of the preceding vehicle has crossed E2. This is also true for the distance separating the sensor Eo from the sensor E1; that distance should be less than the distance $x + y$. Otherwise, an auxiliary sensor must also be inserted between the two.

As soon as the second axle has crossed the detector A1, the decoder 4 changes over to the state 2 and the AND gates 17, 18 and 20 no longer receive an enabling input, this meaning that the category of wheel base is determined only between the first and the second axle.

When at last the vehicle no longer cuts the beam from the vehicle separator SV, that beam is re-established, and the transducer 1 provides an electric signal sent to a differentiator 21 which generates an output pulse at the leading edge of the signal from separator SV. The output of that differentiator 21 is connected on the one hand to the buffer memory 11 and the signal which comes from the differentiator 21 causes the storing in the buffer memory 12 of the data contained in the memories MRJ, MH . . . etc., and on the other hand to a delay circuit 22 sending out a signal to an electronic unit warning that the contents of the buffer memory 11 is available. Moreover, the transducer 1 is also connected to the delay circuit 3 whose output is connected to the memories MRJ, MH, ME1, ME'o, ME2 and to the reversible counters CA1 and CA2 for the resetting to zero thereof; the delay circuit 3 is designed to allow the resetting to zero of the memories and counters only after the storing has taken place in the buffer memory 11. The decoder 4 is automatically reset to 0 when the counter CA1 is also.

It must be understood that the example described has no limiting character and that it would be possible to have a greater number of wheel base sensors, making it possible to have more than three categories of wheel base as has been chosen in the example described. It would be possible also to have only one wheel base sensor E1 and there would then be only two categories of wheel base.

It is evident that, in the case where the classification of the vehicles is effected only according to the factor of the number of axles, and, contingently, the presence or absence of twin wheels and height, the wheel base detector would not be required. Thus, it will be apparent that the embodiment shown is only exemplary and that various modifications can be made in construction and arrangement within the scope of the invention as defined in the appended claims.

I claim:

1. Device for determining the category of a vehicle according to a pre-established group of categories, comprising: counting detector means for detecting the passing or presence of axles and arranged traversally to the roadway, logic means connected to said counting detector means for determining the direction of movement, a reversible counter controlled by said logic means for counting the number of axles crossing said counting detector means, vehicle separating means placed near said counting detector means and having a first transducer element providing an electric signal when no vehicle is placed in front of the vehicle separating means, reset detector means for detecting the passing or presence of axles arranged traversally on the roadway and situated at a distance from said counting detector means which is less than the minimum wheel base which is required to be determined, a second transducer connected to said reset detector means and providing an electric signal when said reset detector means is actuated, a logic OR circuit receiving as one input the output of said second transducer, a delay circuit connected between said first transducer and the other input of said logic OR circuit, and at least one wheel base detector means for detecting the passing or presence of axles placed transversally on the roadway and downstream from said reset detector means in relation to the direction of movement of the vehicles, a third transducer connected to said wheel base detector means, a logic AND gate receiving as a gated input the output of said third transducer, decoder means connected to said reversible counter for enabling said logic AND gate only when a single axle of a vehicle has passed said counting detector means, said reversible counter having an input for resetting the zero connected, through the said delay circuit to the said first transducer a wheel base memory device receiving the output of said logic AND gate and having an input for resetting to zero connected to the output of the said logic OR circuit.

2. Device according to claim 1, further comprising a plurality of wheel base detector means and a plurality of transducers connected to corresponding ones of said plurality of wheel base detectors, a plurality of logic AND gates and a plurality of wheel base memory devices receiving the outputs of respective ones of said plurality of logic AND gates, the logic AND gates each related to a wheel base detector means other than the first wheel base detector means each having three inputs, one of which is connected to the output of the wheel base memory device related to the preceding wheel base detector means.

3. Device according to claim 2, wherein the distance separating said reset detector means and the first wheel base detector means as well as the distance separating each wheel base detector means from the neighboring wheel base detector means is less than the minimum sum of the distance comprised between the front of a vehicle and the first axle and of the distance comprised between the rear of a vehicle and the last axle.

4. Device according to claim 2, further comprising an auxiliary detector means placed between two wheel base detector means when the distance separating two wheel base detector means is greater than the minimum sum of the distance comprised between the front of a vehicle and the first axle and of the distance comprised between the back of a vehicle and the last axle, a fourth transducer conntected to said auxiliary detector means, a second logic AND gate having three inputs, and an auxiliary memory device receiving the output of said second logic AND gate, said second logic AND gate receiving as inputs the output of said fourth transducer, the output of the preceding wheel base memory device, and the enabling output from said decoder means.

5. Device according to claim 2, further comprising height detector means placed above end level with said counting detector means and including a fourth transducer a second logic AND gate whose first input is connected to the 0 output of said decoder means and whose second input is connected to the output of the logic means for determining the direction of movement and whose third input is connected to the output of said fourth transducer, a height memory device receiving as an input the output of said second logic AND gate, said height memory device having an input for resetting to zero connected through the said delay circuit to the output of the said first transducer.

6. Device according to claim 5, further comprising a buffer memory connected to receive the output of said wheel base memory devices, said height memory device, and said reversible counters, a differentiator connected to the output of said first transducer and generating a transfer pulse to said buffer memory on the leading edge of a signal from said first transducer, the data contained in the said memory devices being transferred in said buffer memory when the vehicle has ended its pass in front of the said vehicle separating means.

* * * * *